GEORGE W. FITTS.
Improvement in Traction Wheel.

No. 119,922. Patented Oct. 17, 1871.

Witnesses
August Albrecht.
Otto Albrecht.

Inventor:
George W. Fitts

UNITED STATES PATENT OFFICE.

GEORGE W. FITTS, OF OBERLIN, OHIO.

IMPROVEMENT IN TRACTION-WHEELS.

Specification forming part of Letters Patent No. 119,922, dated October 17, 1871.

*To all whom it may concern:*

Be it known that I, GEORGE W. FITTS, of the village of Oberlin, in the county of Lorain and State of Ohio, have invented a new and Improved Traction-Wheel, of which the following is a specification:

The nature of my invention consists in the construction of a traction-wheel with side plates of boiler or plate-iron, formed circular and of the diameter of the wheel, and bolted together upon the hub and outer rim and partitions which rest between them. This rim and partitions are so arranged between the side plates as to form pockets in the outer rim of the wheel, into which are placed rubber blocks which form the face of the wheel, giving it elasticity, traction, and strength.

Figure 1:
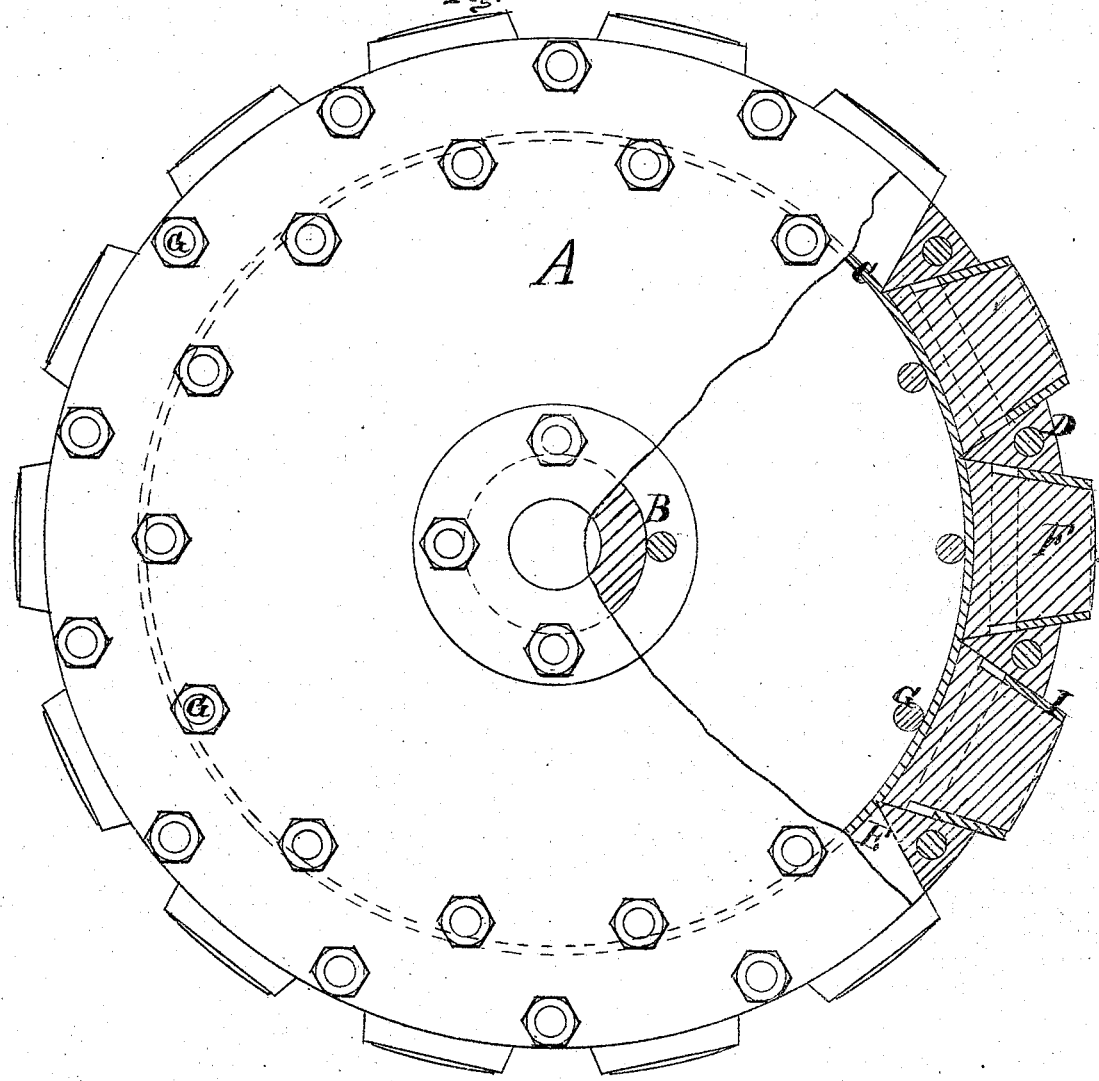
Figure 2:
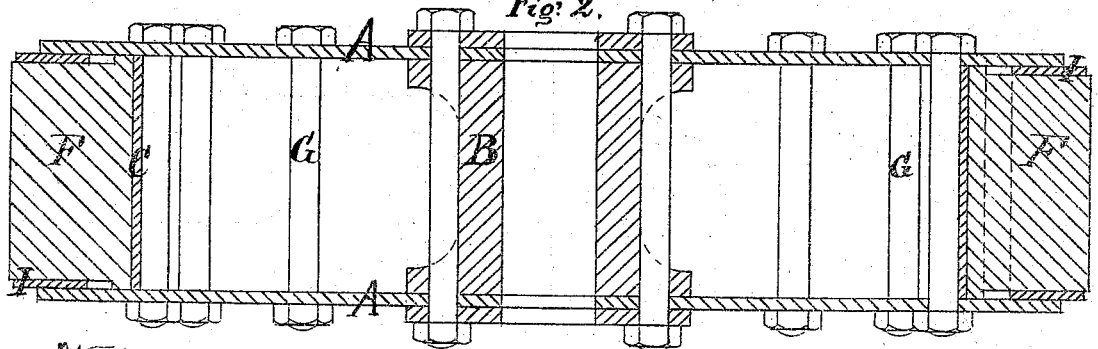

In order to fully explain my invention, the following description and accompanying drawing are referred to:

Figure 1 is a side elevation of the wheel with one of the side plates partially removed, showing the hub, rim, and partitions that rest between the plates, with the rubber blocks in their places within the pockets. Fig. 2 represents sectional views of the parts of the wheel.

A represents the side plates, which are formed of plate or boiler-iron made circular and of the full size of the wheel, and of sufficient thickness to give the strength needed; they are perforated at the proper places for the reception of bolts which fasten them together upon the hub, rim, and partitions that rest between them, as at G, Fig. 1; also, with narrow slots which pass through into the base of the pocket H, Fig. 1. B is the hub of the wheel; it may be formed of cast or wrought-iron, circular and perforated at the center for the reception of the axle. The ends are cut down smooth, so that they will rest evenly and solid between the side plates which are bolted to them, as at B, Fig. 1. C is the rim that rests between the plates; it is formed of iron of the proper breadth and thickness; it is of less diameter than the side plates, and rests between them, its outer surface being enough below the outer rims of these plates to give the required depth to the pockets, of which it forms the base. This rim is held in its place between the side plates by bolts that pass through the plates and upon the under surface of the rim which rests upon them, as at C and G, Fig. 1. D are the partitions that divide the space between the plates A and rim C into pockets. These partitions are made of plate-iron formed into triangular shape. They are placed at equal distances apart between the side plates, with their narrow edge resting upon the outer surface of the rim A, as at D, Fig. 1, their outer or broadest side being even with and forming a part of the surface of the wheel. They are perforated through from the side at their broadest point, as at G', Fig. 2, so as to admit a bolt which passes through them from the side plates and keeps them in their place, and when thus in place they form, with the side plates, the walls of the pockets for the reception of the blocks F. E are the pockets, in which the rubber-blocks rest. They are formed, as above described, in the outer rim of the wheel by the arrangement of the plates A, rim C, and partitions D, Fig. 1. These pockets hold the rubber blocks in their places on the rim of the wheel, permitting them to work up and down within the pockets. F are the rubber blocks. These blocks are made to fit the pockets E, and are broader at the base than at the face, which prevents them from working out of the pocket, and at the same time permits them to spring down by any pressure that is applied to their surfaces. They may be used with a metal cap that extends down their sides into the pocket, as at I, Figs. 1 and 2.

I claim—

A traction-wheel, constructed and arranged substantially as and for the purposes herein set forth and described.

GEORGE W. FITTS.

Witnesses:
LENA A. FITTS,
B. W. LOCKE.